(12) United States Patent
Van Den Bossche

(10) Patent No.: US 10,491,150 B2
(45) Date of Patent: Nov. 26, 2019

(54) SWITCHED RELUCTANCE MACHINE AND POWER CONVERTER

(71) Applicant: UNIVERSITEIT GENT, Ghent (BE)

(72) Inventor: Alex Van Den Bossche, Herzele (BE)

(73) Assignee: UNIVERSITEIT GENT, Ghent (BE)

( * ) Notice: Subject to any disclaimer, the term of this patent is extended or adjusted under 35 U.S.C. 154(b) by 0 days.

(21) Appl. No.: 16/098,973

(22) PCT Filed: May 4, 2017

(86) PCT No.: PCT/EP2017/060731
§ 371 (c)(1),
(2) Date: Nov. 5, 2018

(87) PCT Pub. No.: WO2017/191298
PCT Pub. Date: Nov. 9, 2017

(65) Prior Publication Data
US 2019/0149075 A1    May 16, 2019

(30) Foreign Application Priority Data
May 4, 2016    (EP) .................................. 16168462

(51) Int. Cl.
*H02P 25/092* (2016.01)
*H02P 9/40* (2006.01)
*H02K 19/10* (2006.01)

(52) U.S. Cl.
CPC ........... *H02P 25/092* (2016.02); *H02K 19/10* (2013.01); *H02P 9/40* (2013.01)

(58) Field of Classification Search
CPC ...... H02P 1/00; H02P 1/04; H02P 1/12; H02P 1/16; H02P 1/163; H02P 1/24; H02P 1/26;
(Continued)

(56) References Cited

U.S. PATENT DOCUMENTS

| 4,896,088 A * | 1/1990 | Jahns | H02P 9/02 318/685 |
| 4,933,621 A * | 6/1990 | MacMinn | H02P 25/092 310/163 |

(Continued)

FOREIGN PATENT DOCUMENTS

| EP | 0692862 A2 | 1/1996 |
| EP | 1441435 A1 | 7/2004 |

(Continued)

OTHER PUBLICATIONS

Silva et al., "A New Three Phase Full-Bridge C-Dump Converter Applied to Switched Reluctance Motor Drives," IEEE, 2005, pp. 2684-2690.

(Continued)

*Primary Examiner* — Antony M Paul
(74) *Attorney, Agent, or Firm* — Workman Nydegger

(57) ABSTRACT

A generator or motor system for converting mechanical power into electrical power or vice versa, comprises: a switched reluctance machine having a rotor and a stator with a number of phase windings, the phase windings being partitioned in groups, each group comprising at least two phase windings connected in series to form a ring structure; a power electronics circuit comprising: for each ring structure, an independently controllable means for generating a circulating current in said ring structure; a number of legs, each of the legs comprising at least two diodes or switches connected in series between a first and a second voltage rail, each leg having an intermediate node located between the two diodes or switches, and connected to a corresponding intermediate node between two phase windings of a ring structure.

20 Claims, 11 Drawing Sheets

(58) Field of Classification Search
CPC .... H02P 1/32; H02P 1/42; H02P 1/423; H02P 1/426; H02P 1/46; H02P 3/00; H02P 6/00; H02P 6/14; H02P 6/20; H02P 21/00; H02P 21/0042; H02P 21/0046; H02P 23/00; H02P 23/0095; H02P 25/021; H02P 27/00; H02P 27/08; H02P 27/04; H02P 27/06; H02P 27/085; H02P 25/08
USPC ... 318/400.01, 700, 701, 727, 800, 801, 430
See application file for complete search history.

(56) References Cited

U.S. PATENT DOCUMENTS

| | | | |
|---|---|---|---|
| 5,923,142 A | 7/1999 | Li | |
| 6,979,974 B2* | 12/2005 | Slater | G01D 5/2013 318/701 |
| 7,151,359 B2* | 12/2006 | Randall | H02P 9/305 322/20 |
| 7,201,244 B2* | 4/2007 | Johnston | B60K 6/46 180/65.51 |
| 2013/0234638 A1* | 9/2013 | Tanaka | H02P 25/22 318/400.27 |

FOREIGN PATENT DOCUMENTS

| | | |
|---|---|---|
| GB | 2520260 A | 5/2015 |
| WO | 2010006851 A1 | 1/2010 |

OTHER PUBLICATIONS

Clothier et al., "The Use of Three Phase Bridge Inverters With Switched Reluctance Drives," IEE Conference Publication No. 444, Sep. 1997, pp. 351-355.
Lee et al., "A Magnetless Axial-Flux Machine for Range-Extended Electric Vehicles," Energies, vol. 4, 2014, pp. 1483-1499.
European Search Report from EP Application No. 16168462.6, dated Oct. 21, 2016.
International Search Report from PCT Application No. PCT/EP2017/060731, dated Jul. 26, 2017.

* cited by examiner

SWITCHED RELUCTANCE MACHINE AND POWER CONVERTER

FIELD OF THE INVENTION

The invention relates to the field of Switched Reluctance machines (SRM), in particular to a system comprising a Switched Reluctance machine (SRM) such as a Switched Reluctance Motor or a Switched Reluctance Generator and a specific power converter circuit connected thereto.

BACKGROUND OF THE INVENTION

Switched Reluctance Machine is a term used for both Switch Reluctance Motors and Switch Reluctance Generators. The abbreviation SR stands for Switched Reluctance. The abbreviation SRM is used for SR Motors or SR Machines, the latter including SR Generators.

The principle of operation of SR machines is well known in the art, although SR machines are much less used as compared to Brushless DC (BLDC) motors for example. A good reference document to SR machines is "Switched Reluctance Motors And Their Control" by T. J. E. Miller. Many references can be found on the operation of a switched reluctance motor. The document by T. J. E. Miller also shows that many variants exist in number of teeth, phases, topology and control. The number of teeth can vary considerably, from 2 stator teeth and 2 rotor teeth to high numbers (for example 8 or 12 or more). An example of an SR machine with 12 stator teeth and 8 rotor teeth is shown in FIG. 1. Around the stator teeth a winding is wound (not explicitly shown but indicated with letter A and A' for the first winding, B and B' for the second winding, etc.), one or more of these windings constitute the phase winding of the switched reluctance machine.

SR machines are typically driven by asymmetric H-bridges (see FIG. 5) to control the current in the phase windings. These windings can be assembled in 2, 3, 4, 5 or more phases. An example with three-phase windings A, B, C is shown in FIG. 2.

FIG. 4 shows an ideal flux-linkage ($\Psi$) versus current (I) diagram, known in the art, representing the energy conversion from electrical energy into mechanical in an SR motor, as the rotor moves from an unaligned position to an aligned position and to the next unaligned position. Starting from a first working point wp1 with no current in the phase winding, a current Ic is applied (by an electrical drive circuit, not shown), and the working point quickly moves to working point wp2, the rotor still being in an unaligned position, but now a current Ic is flowing through the phase winding. Assuming that the current Ic is maintained for a while, the rotor moves from an unaligned position (wp2) to an aligned position (wp3). Then the current in the phase winding quickly decreases to zero, and the working point moves quickly from wp3 to wp4, which in the flux-linkage versus current diagram coincides with working point wp1. The area of the shape described by the working points represents the energy W converted from electrical to mechanical.

Apart from the functional aspects described above (mainly related to controlling the power switches as a function of angular rotor position), a proper design of a drive circuit should also take into account the power rating of the components. It is well known that components with a higher power rating are typically also more expensive, and in case of Switched Reluctance Motors/Generators, the power electronics can form an important fraction of the total cost (e.g. up to 50%). Hence large efforts are made in attempts to reduce the system cost by lowering the cost of the power electronics. The use of a lower number of power switches or the use of more common (in the sense of: more readily available, less exotic) power electronics are two possibilities to reduce the cost.

FIG. 6 shows the usual converter topology for a brushless DC motor control and for induction motors. These full transistor bridges got so common that 6 transistors with internal freewheel diode got much cheaper than 6 transistors with external diodes in asymmetric H-bridges of FIG. 5. Unfortunately, these full transistor bridges cannot be used to drive SR machines, unless only one transistor of each full bridge would be used, which is very cost ineffective. Referring back to FIG. 4, the converted energy is represented by the area W defined by the working points wp1-wp4, which has rounded corners in practice. The maximal peak-peak flux is maximally $Vd \times T/2$, where Vd is the supply voltage of the full bridge and T is the electrical period of the voltage profiles over, or the current profiles in the phase winding. The converted energy W is typically 60% of the peak to peak flux×Imax. The maximal converted energy per period for one phase is typically about $0.6 \times Vd \times Imax/2$, hence the average power is typically about $0.3 \times Vd \times Imax$. In a three-phase converter for a brushless DC motor (see e.g. FIG. 6), the maximal converted average power for one phase (two transistors) is $(2/3) \times V1/2*Imax=0.33 \times Vd \times Imax$, where Vd is the supply voltage, and Imax is the current flowing through the windings A, B, C. Note that the voltage over one phase A, B, C is about equal to half the voltage Vd/2 of the series connection of the two transistors. If the same calculation is done for a synchronous machine under sine wave current and the circuit of FIG. 6, the line to line voltages is limited to the DC bus, the star voltage to $Vd/\sqrt{3}$ and the maximal average power gets $Vd/\sqrt{3} \times Imax/2 * \cos(\varphi) = 0.289 \times Vd \times Imax \times \cos(\varphi)$, where $\varphi$ is the phase difference between the first harmonic of the current and first harmonic of the voltage.

Referring back to drive circuits for SR machines, in particular to the drive circuit of FIG. 2, due to the external diodes, the switched reluctance drive circuits need two times more legs for a similar power rating, which makes the hardware more expensive.

U.S. Pat. No. 5,923,142 describes a reluctance machine system including a reluctance machine having a rotor and a stator and one additional auxiliary field winding. The publication "A Magnetless Axial-Flux Machine for Range-Extended Electric Vehicles" by Lee in Energies 2014, 7(3), 1483-1499; doi:10.3390/en7031483 describes a reluctance machine system including a reluctance machine having a rotor and a stator and two additional auxiliary field windings. Constant current(s) are established in the auxiliary field winding(s) to assist in the establishment of a magnetic field in the machine to improve the machine's performance, or stated in other words: to provide a motor with more power without having to increase the power rating of the switches, but at the expense of changing the physical SR motor by adding an additional winding and means for powering it. A good understanding of this document may help to better understand the present invention.

There is still room for improvements or alternatives.

SUMMARY OF THE INVENTION

It is an object of embodiments of the present invention to provide a good Switched Reluctance System comprising a Switched Reluctance Machine (Motor or Generator) and a power electronics circuit connected thereto.

In particular, it is an object of embodiments of the present invention to provide a Switched Reluctance System using a standard Switched Reluctance Machine (without windings carrying a substantially constant current) with a specific or alternative power electronics topology.

In particular, it is an object of embodiments of the present invention to provide a Switched Reluctance System using a standard Switched Reluctance Machine (without additional phase windings) with a power electronic circuit which is more cost effective and/or is based on widely available electronic components.

It is an object of particular embodiments of the present invention to provide a Switched Reluctance Generator using a standard Switched Reluctance Machine (without windings other than the phase windings used to rotate the machine/generate power) and coupled to power electronics with "legs" not requiring active control.

It is an object of particular embodiments of the present invention to provide a Switched Reluctance Motor using a standard Switched Reluctance Machine (without additional phase windings) and with power electronics comprising power switches of the full bridge type (2 or more legs).

It is an object of particular embodiments of the present invention to reduce the power rating of the power switches for a given performance.

This objective is accomplished by a method and device according to embodiments of the present invention.

According to a first aspect, the present invention provides a system for converting mechanical power into electrical power, the system comprising: a switched reluctance machine having a rotor and a stator, the stator having a number of phase windings, the phase windings being partitioned in one or more groups, each group comprising at least two phase windings, all phase windings of each group being connected in series to form a ring structure; a power electronics circuit comprising: for each ring structure, a means for causing a circulating current to flow in said ring structure, the means for causing a circulating current being independently controllable; a number of legs equal to the number of phase windings, each of the legs comprising only passive components including at least two diodes connected in series between a first voltage rail and a second voltage rail, each leg having an intermediate node located between the two diodes, each intermediate node of the legs being connected to a corresponding intermediate node of the ring structure, the intermediate nodes of the ring structure being located between two phase windings.

The means may be controllable independent from other currents running in the system.

The means for causing a circulating current may be controllable independent of the driving of the phase windings.

The means for causing a circulating current may be continuously available.

Per ring, a means for causing a circulating current may be present, e.g. per ring structure only one means for causing a circulating current may be present.

The number of phase windings and the number of legs may be at least three.

The number of phase windings and the number of legs may be exactly two.

It is an advantage of embodiments of the present invention that the number of wires required at the machine may be only 3 if the system is integrated in the machine, or may be only 4. In at least some of the prior art systems, up to 4 or even up to 6 wires may be required.

It is an advantage of embodiments of the present invention that the losses occurring can be low, i.e. they may be equivalent with losses through a single diode.

It is an advantage of embodiments of the present invention that the system may operate accurately even at low speed. It is an advantage of embodiments of the present invention that no reverse current operation is involved. It is an advantage of embodiments of the present invention that the system is an asymmetric system.

This system can be used as an electrical generator.

The "means for causing a circulating current to flow" can be "means for generating a circulating current", such as a voltage source or a transformer or the like, causing a current to flow by applying a voltage over the impedance of the phase windings.

The underlying principle of operation of this generator is based on the fact that, for each phase winding (sequentially over time), the total current flowing through the phase winding, being the sum of the circulating current (e.g. DC current) and an individual AC current flowing through one or more diodes, describes a shape in the flux-linkage-current diagram, for example a diamond-like shape, as the rotor moves relative to the stator, thereby converting mechanical energy into electrical energy. In the generator system, the AC-currents flowing through the diodes adapt automatically as the rotor rotates.

It is an important advantage of this system, that it contains a "standard" Switched Reluctance (SR) machine, not requiring an additional winding as described for example in U.S. Pat. No. 5,923,142. This is an advantage because existing SR machines or designs can be used.

It is an advantage of the present invention over prior art documents (such as U.S. Pat. No. 5,923,142) that less copper windings can be used and less iron, because there is not additional winding, since the windings which are already present are being used (reducing weight and cost). A drawback of the prior art system is that quite a lot of room is required to locate the additional winding, and that the stator yoke has to go around it and hence more iron is needed as well. Finally, a non-standard SRM design concept is being used.

It is an advantage of this power generator system that no position sensor is necessary.

It is an advantage of this power generator system that no controller (or signal generator) is necessary, because passive components and diodes do not need control signals, in contrast to power switches.

The amount of power generated by this machine is expected to be less than could be realized when using active components and active control (e.g. power transistors).

According to a second aspect, the present invention provides a system for converting mechanical power into electrical power, the system comprising: a switched reluctance machine having a rotor and a stator, the stator having a number of only two phase windings, the phase windings being connected in series to form a single ring structure; a power electronic circuit comprising: a means for causing a circulating current to flow in said ring structure; a number of only two legs, each of the legs comprising only passive components including two diodes connected in series between a first voltage rail and a second voltage rail, each leg having an intermediate node located between the two diodes, each intermediate node of the legs being connected to a corresponding intermediate node of the ring structure, the intermediate nodes of the ring structure being located between the two phase windings.

This is a variant of the generator circuit according to the first aspect, having only two phase windings arranged in a single ring.

In an embodiment according to the first or second aspect, the system further comprises a number of capacitors, wherein the number of capacitors is equal to the number of phase windings and each of the capacitors is arranged in parallel with one phase winding. With "the number of capacitors" is meant the number of capacitors in the schematic, which is the number of "logical capacitors", not necessarily the number of physical capacitors. Thus, two or more "physical capacitors" connected in parallel between a first and a second node are to be considered as a single "logical capacitor".

In an embodiment according to the first or second aspect, the system further comprises a number of capacitors, wherein the number of capacitors is equal to the number of phase windings and the capacitors are arranged in a star-configuration.

In an embodiment according to the first or second aspect, the system further comprises a number of capacitors, wherein each of the number of capacitors is arranged in parallel with one of the diodes.

It is an advantage of adding capacitors, because they allow the power efficiency to be improved. In fact it allows to recover the power density, which a transistor control would do, about 1.2 to 2.0 times the torque, but in a less wide speed range.

Embodiments with capacitors are very well suited for flow machines such as wind turbines or high-pressure turbines running at high speed.

In particular embodiments, the number of capacitors may be twice the number of phase windings.

According to a third aspect, the present invention provides a system for converting electrical power into mechanical power or vice versa, the system comprising: a switched reluctance machine having a rotor and a stator, the stator having a number of phase windings, the phase windings being partitioned in one or more groups, each group comprising at least two phase windings, all phase windings of each group being connected in series to form a ring structure; a power electronics circuit comprising: for each ring structure, a means for generating a circulating current in said ring structure, wherein the means for causing a circulating current is independently controllable; a number of at least two legs equal to the number of phase windings, each of the legs comprising at least two power switches connected in series between a first voltage rail and a second voltage rail, or some of the legs comprising two power switches connected in series between a first voltage rail and a second voltage rail and the other of the legs comprising two capacitors connected in series between the first voltage rail and the second voltage rail; each leg having an intermediate node located between the two power switches or between the two capacitors, each intermediate node of the legs being connected to a corresponding intermediate node of a ring structure, the intermediate nodes of the ring structure being located between two phase windings; the controller comprising or being connected to an angular position sensing means for determining an instantaneous angular position of the rotor with respect to the stator; the controller being further adapted for providing a plurality of control signals to the power switches of the legs for selectively activating one or more of the switches depending on the angular position of the rotor.

The number of phase windings and the number of legs may be at least three, and each of the legs may comprise at least two power switches connected in series between a first voltage rail and a second voltage rail.

The number of phase windings and the number of legs may be two and one of the legs may comprise two power switches connected in series between a first voltage rail and a second voltage rail and the other of the legs may comprise two capacitors connected in series between the first voltage rail (N1) and the second voltage rail.

This system can be used as an actively controlled Switched Reluctance Generator, or as a Switched Reluctance Motor.

As far as the inventors are aware, a circuit topology with the phase windings of a Switched Reluctance machine arranged in one or more ring structures, and wherein the phase windings are connected to intermediate nodes of the legs between two power switches (e.g. the intermediate nodes of full transistor bridge), is not known in the art, and is in fact quite revolutionary, because it can dramatically change the economic viability of systems with SR-machines.

Before this invention was made, the power electronics of an SR-motor system (e.g. to drive a 50 kW motor) could easily amount up to about 50% of the total cost, mainly because of the common believe that the legs of an SR-motor simply cannot be driven with benefit with full transistor bridges, because of the believe that "the coils of an SR machine must always be placed between two switches", and full transistor bridges only have one "intermediate node".

The present invention, however, provides the insight that it is, contrary to common believe, very well possible to use full transistor bridges, provided that the phase windings of the SR-machine are arranged in one or more ring structures, and provided that a circulating current is provided therein. Hence, the ring topology and circulating current "enables" the use of full transistor bridges. This allows the price of the power electronics of some SR systems (for which components with the optimal power rating is not available) to be drastically reduced.

The underlying principle of operation of this system is based on the fact that, for each phase winding (sequentially over time), the total current flowing through the phase winding, being the sum of the circulating current (e.g. DC current) and an individual AC current flowing through one or more of the power switches, describes a shape in the flux-linkage-current diagram, between a minimum current and a maximum current, as the rotor moves relative to the stator, thereby converting electrical energy into mechanical energy, or vice versa. The controller opens or closes the switches as a function of the angular position of the rotor, and thereby causes a so called AC-current to be superimposed on the circulating current.

It is an advantage that, at least in some embodiments, the controller only requires angular position information, but does not need to know exactly which currents are flowing in each of the phase windings.

It is an advantage that, at high speed, torque can be changed by controlling the phase angle between the angular position and the control signals provided to the legs (e.g. each leg can provide a block waveform. By controlling the phase shift relative to the rotor, the power can be controlled over a large power range).

It is an advantage that no eddy currents are generated in magnets or in damper cages as none of them are present, this results in an advantage over permanent magnet and over traditional synchronous machines.

It is an advantage that the circulating current is generated by a first voltage generation means other than the power switches, hence, the power switches need not be dimensioned for providing or sinking the circulating current (also referred to herein as "DC current"), but only for providing or sinking the second current (also referred to herein as "AC current").

It is a major advantage that the circulating current generated by the first voltage generating means can be rectified from a low frequency current (to obtain for example a DC current or a DC current with a current ripple as typically obtained by a rectifier), which, even though its magnitude is relatively large (for example in the order of 600 Amps), can be produced in a relatively inexpensive manner. In contrast, the circuits using power switches (e.g. power transistors) are typically operated at relatively high frequency (for example at least 400 Hz or at least 10 kHz or at least 25 kHz or at least 50 kHz or at least 100 kHz or even at least 150 kHz), may also be used as switched mode converters allowing to get compact solutions. Switching at a relatively low frequency (e.g. about 400 Hz) has the advantage that switching losses are negligible, and that normal transformer iron can be used. Switching above 25 kHz has the advantage that the switching is inaudible to human beings.

It is a major advantage of using a topology with one or more ring structures in combination with a first voltage generating means, because it allows a relatively large total current Idc+Iac (for example having an amplitude of 1.8× Idc) to flow in one of the phase windings, and a relatively small current Idc−Iac (for example having an amplitude of 0.2×Idc) to flow in the other phase windings. The power rating of the switches and diodes (for a given maximum total current in the winding, or for a given torque) can be reduced (as compared to the classical drive circuit used for SR motors) as Idc+Iac is less than the equivalent Imax needed in case of traditional power electronics, which for power electronics components typically has a significant impact on cost and/or lifetime.

It is an advantage of this power converter that it can be used for driving existing SRM machines (motor or generator), because it does not require an additional dedicated winding for generating a DC magnetic field, (as described for example in U.S. Pat. No. 5,923,142), but only requires that the existing phase windings are electrically interconnected in a ring topology, and that a circulating current is injected therein.

The means for generating the circulating current may be a synchronous rectifier.

The means for generating the circulating current and the different phase windings may form a series connection.

According to a fourth aspect, the present invention provides a system for converting electrical power into mechanical power or vice versa, the system comprising: a switched reluctance machine having a rotor and a stator, the stator having a number of only two phase windings being connected in series to form a single ring structure; a power electronics circuit comprising: a means for causing a circulating current to flow in said ring structure, or a means for allowing a circulating current to flow in said ring structure; a number of only two legs; each of the legs comprising two power switches connected in series between a first voltage rail and a second voltage rail, or one of the legs comprising two power switches connected in series between a first voltage rail and a second voltage rail and the other of the legs comprising two capacitors connected in series between the first voltage rail and the second voltage rail; each leg having an intermediate node located between the two power switches or between the two capacitors, each intermediate node of the legs being connected to a corresponding intermediate node of the ring structure, the intermediate nodes of the ring structure being located between two phase windings; the controller comprising or being connected to an angular position sensing means for determining an instantaneous angular position of the rotor with respect to the stator; the controller being further adapted for providing a plurality of control signals to the power switches of the legs for selectively activating one or more of the switches depending on the angular position of the rotor.

This is a variant of the Motor circuit according to the third aspect, having only two phase windings arranged in a single ring.

In an embodiment according to the third or fourth aspect, the system further comprises a plurality of current sensors for measuring a plurality of currents flowing through the power switches, and/or the system further comprises a plurality of current sensors for measuring a plurality of total current flowing through the phase windings, and/or the system further comprises a plurality of current sensors for measuring a plurality of currents flowing between the intermediate nodes of the legs and the intermediate nodes of the one or more ring structure; and the controller is adapted for controlling the power switches) such that the currents measured by the plurality of current sensors follow a predefined set of waveforms which are shifted in phase for the phase windings over preferably 360 electrical degrees divided by the number of stator poles.

It is an advantage of this embodiment that the controller can control the switches such that actual current waveforms of (i) the current flowing through the switches and/or (ii) the current flowing between the intermediate nodes of the legs and the intermediate nodes of the ring structures and/or (iii) the total current flowing through each of the phase windings, corresponds or corresponds better with a predefined set of waveforms.

In a preferred embodiment, the waveforms applied to the power switches are phase shifted waveforms. This offers the advantage that the waveform can be implemented more efficiently, e.g. can be generated on the fly more easily, or can be stored more compact in a non-volatile memory.

In an embodiment according to the third or fourth aspect, the legs are implemented as half-bridges.

It is a major advantage of using the hardware topology described above, with one or more ring structures and a circulating current, because it allows to use so called "full transistor bridges", which are commercially widely available in many different power ratings, in contrast to the classical components typically used for SR-machines, where one has to severely over-design if components of the desired power-rating are not available, (e.g. by having to use 1200 A devices if 600 A devices are not available), which is a huge cost disadvantage.

As far as is known to the inventors, so far SRM motors have never been driven by means of half-bridges with unidirectional currents in the phases, and with a single main power supply but this is made possible by the present invention.

In an embodiment according to the first, second, third or fourth aspect, the means for generating the circulating current is a means for generating a substantially constant circulating current.

In this embodiment, no current sensor, load sensor, angular speed sensor, etc. are required, and the circulating current is generated independent of load or speed. This reduces the component count, the system and maintenance cost, and improves reliability.

It is noted that "voltage ripple" coming for example from a switched power supply with or without low-pass filter, or coming from a magnetic coupling followed by a rectifier with/without a low pass filter is relatively low compared to the main supply voltage, for example the voltage ripple is less than 10% of the main supply voltage. The leg currents (e.g. the AC current through the transistors or capacitors or diodes) are superimposed to the circulating current, generating the actual almost pulsed currents in the phase windings.

In an embodiment according to the first, second, third or fourth aspect, the means for generating the circulating current is a means for generating an adjustable circulating current; and the system further comprises at least one sensing means for providing information related to at least one of the amplitudes of the phase winding currents, mechanical loading conditions, a temperature, an angular speed of the rotor; and the means for generating the circulating current is adapted for adjusting the circulating current based on the information obtained from said at least one sensing means.

It is noted that "speed" can be derived from the angular position (for example as the time derivative), and that "torque" or "load" can be derived from the current.

It is an advantage of this embodiment that the circulating current can be adapted as a function of for example load and/or speed. In this way the amplitude of the AC-currents flowing through the power switches may be influenced, and/or the power efficiency of the system may be improved, and/or the extracted electrical power can be matched with the available mechanical power or vice versa. In each case, it provides an additional degree of freedom of how to control the SR system.

The at least one sensing means may be at least one sensor selected from the group consisting of a load sensor, an angular position sensor, a current sensor, a temperature sensor and an angular speed sensor.

In an embodiment according to the first, second, third or fourth aspect, all phase windings of the switched reluctance machine are arranged in a single ring structure.

In an embodiment according to the first, second, third or fourth aspect, the means for generating the circulating current comprises a magnetically coupled circuit, optionally further comprising at least one switch and optionally further comprising at least one diode.

The magnetically coupled circuit may comprise or may be a transformer, which may be coupled to an external power supply. The power supply may be the same as the power supply providing a voltage on the voltage rails, or may be independent therefrom (e.g. a battery). It is an advantage of using a magnetic coupled circuit, e.g. a transformer, to provide the circulating current, because it can provide galvanic separation.

According to a fifth aspect, the present invention provides a turbine comprising a system according to any of the first, second, third or fourth aspect.

The turbine may for example be a wind turbine. In the past, switched reluctance machines were not considered a good, let alone the best choice as generator for wind turbines, inter alia because of price issues, and because of required control circuitry. It is a particular advantage of SR machines according to the present invention as compared to BLDC motors, that full transistor bridges or even diode bridges with or without capacitors can also be used, but permanent magnets are not required.

The turbine may be a turbine in a flow process, for example a high-speed turbine (e.g. more than 20.000 rpm for a 10 kW turbine). In the past switched reluctance machines were used as generators as the rotor allows higher speeds than permanent magnets or wound rotors. But switched reluctance machines according to the present invention can operate with or without transistors in the legs, and when present, capacitors can enhance the power again to a level as was achieved in the prior art, the generator remains adaptable by controlling V2.

According to a sixth aspect, the present invention provides a wheeled vehicle comprising a system according to any of the first, second, third or fourth aspect.

In the past, switched reluctance machines were not considered a good, let alone the best choice as generator or motor for trucks or buses or other heavy wheeled vehicles, inter alia because of price issues, and because of required control circuitry. However, by making use of the present invention, the price can be drastically changed, and in some embodiments, no control circuitry is required. It is a particular advantage of SR machines that they do not have permanent magnets, which are also relatively expensive. It is a further advantage of SR machines that they can be made more compact than e.g. BLDC motors of the same power.

According to a seventh aspect, the present invention provides a method of repairing or upgrading an existing system comprising a switched reluctance machine with at least three phase windings, the method comprising the steps of: a) disconnecting an existing power electronics circuit from the existing switched reluctance machine; b) partitioning the phase windings of the switched reluctance machine in one or more groups, each group comprising at least two phase windings, and c) connecting all phase windings of each group in series to form a ring structure; d) for each ring structure, providing a means for generating a circulating current in said ring structure wherein the means (V2; V2a, V2b) for generating the circulating current (I2; I2a, I2b) is a synchronous rectifier; e) providing a number of at least three legs equal to the number of phase windings, each of the legs comprising at least two diodes or at least two power switches or at least two capacitors connected in series between a first voltage rail and a second voltage rail, each leg having an intermediate node located between the two diodes or between the two power switches or between the two capacitors; f) connecting each intermediate nodes of the legs with a corresponding intermediate node between two phase windings of the one or more ring structures.

In an embodiment of the seventh aspect, wherein the legs comprise two power switches, the method further comprises the step of: g) providing a controller comprising an angular position sensing means or operatively connected to an angular position sensing means, and connecting the controller to the plurality of power switches.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
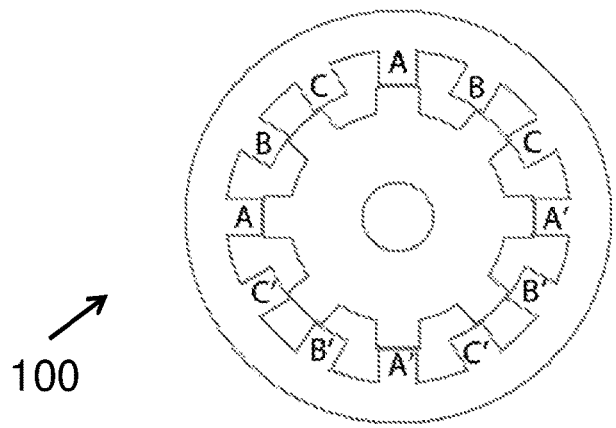
FIG. 1 shows an example of a 12S/8R SR machine with 12 stator poles and 8 rotor poles, known in the art, which can be used in embodiments of the present invention, however the present invention is not limited to only 12S/8R SR machines.

The drawings are only schematic and are non-limiting. In the drawings, the size of some of the elements may be exaggerated and not drawn on scale for illustrative purposes. Any reference signs in the claims shall not be construed as limiting the scope. In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

The inventors of the present invention were confronted with the problem of designing a drive circuit for driving a Switched Reluctance Motor having a power of about 50 kW, with the constraint that the SR motor itself cannot be modified, in contrast to e.g. U.S. Pat. No. 5,923,142 where an additional winding is added to the motor.

Figure 2:
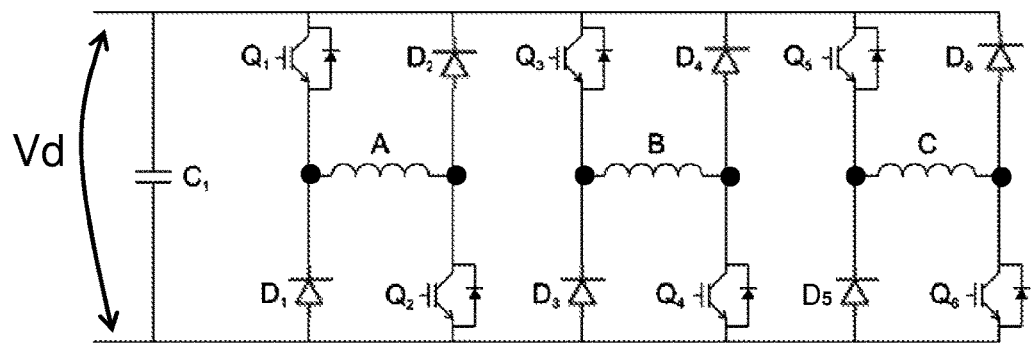
FIG. 2 shows a classical SRM drive circuit known as "asymmetric bridge" with two power switches per phase, typically used for driving the SR motor of FIG. 1.
Figure 3:
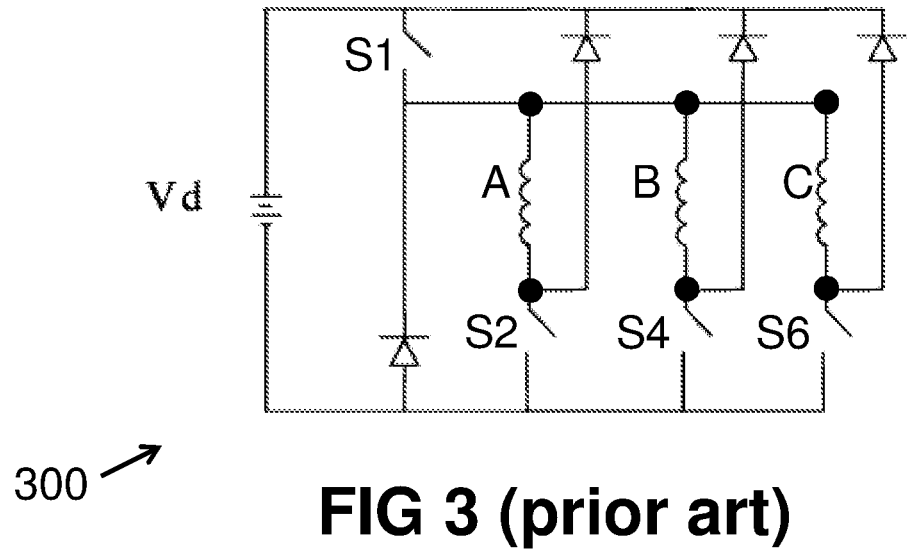
FIG. 3 shows a lower-cost variant of the circuit of FIG. 2, known in the art, where one switch is used in common for three windings. The number of transistors is lower than in the drive circuit of FIG. 2, but the required sum of the peak current×peak voltage of the transistors is higher.

The normal design approach would comprise the following steps:
choose the circuit topology of FIG. 2 (having six transistors) or the circuit topology of FIG. 3 having only four transistors),
select available semiconductor components having a sufficiently large power rating,
select a controller (for example a programmable microcontroller, a programmable DSP, programmable logic, an ASIC, etc.),
design and implement an algorithm for applying suitable control signals to the power switches.

All of these steps are well known in the art, and need no further explanation.

Figure 5:
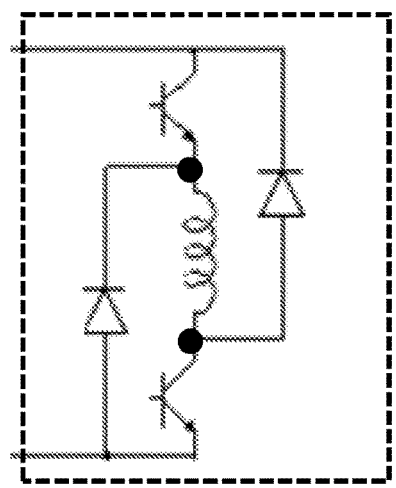
FIG. 5 shows the topology of a single "leg" of the classical SRM drive circuit shown in FIG. 2.

FIG. 5 shows the classical topology of one of the "legs" used in the circuit of FIG. 2. The inventors found that, for their specific design, it would be sufficient to use power electronics with a power rating of 600V-300 A, but due to unavailability of such components, their only alternative was to use components of 1200V-400 A, but these are much more expensive.

When trying to find a less expensive but commercially available solution, they realized that the power electronics components typically used for SR Motors are only available in very coarse steps (for example: if 600V-300 A is not available, the next available power-grade is: 1200V-400 A). This stands in large contrast to for example "full transistor bridges" which are available in fine granularity because these components are much more widely used for different kind of motors, for example BLDC motors and AC motors, but unfortunately, as is well known in the art, full transistor bridges cannot be used to drive SR Motors.

Figure 6:
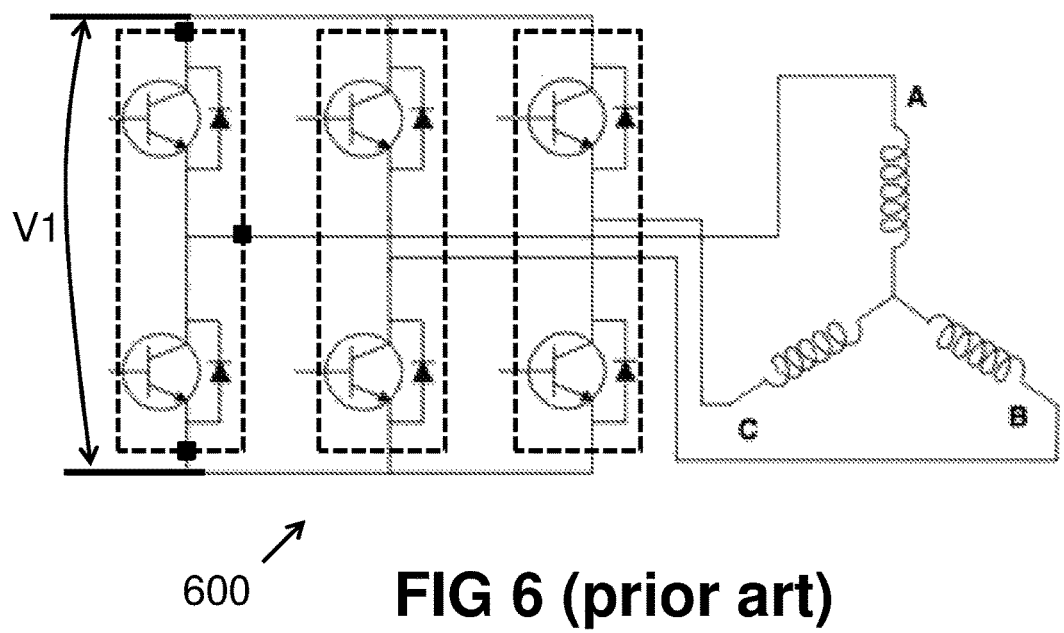
FIG. 6 shows a classical drive circuit for driving a brushless DC (BLDC) motor, permanent magnet AC, synchronous motors and induction motors, known in the art.

FIG. 6 shows a typical drive circuit 600 with three full transistor bridges as is commonly used for driving BLDC motors. The reason why full transistor bridges cannot be used for driving SR Motors (unless only half of the number of the transistors is effectively used and the remainders act/are used as diodes, which is not cost effective) is because full transistor bridges only have three terminals (indicated by square boxes in FIG. 6), and the power switches are internally interconnected, whereas in the circuit of FIG. 2 or FIG. 3 or FIG. 5, the phase winding of an SR Motor needs to be arranged between the two power switches. This is incompatible.

In order to avoid hindsight, it should be noted that, although the SR motor is represented by 3 phase windings in FIG. 2, and the BLDC motor is also represented with 3 phase windings in FIG. 6, it is generally accepted in the art of motor electronics that Switched Reluctance Motors are completely different from BLDC motors, not only the construction of the motor itself (SR motor: no permanent magnets < > BLDC motor: permanent magnets), as well as in the power electronics (SR-motor: circuit of FIG. 2 or FIG. 3 < > BLDC motor: circuit of FIG. 6), as well as the principle of operation (SR-motor: rotor rotates because flux lines want to "decrease the reluctance" < > BLDC motor: rotor rotates because magnetic field of the permanent magnets wants to align with the magnetic field generated by the stator windings), and because of extra components (SR-motors typically require an angular position sensor even at non-zero speed < > many BLDC-motors do not, and use BEMF instead), and because of different control (SR motors: typically only one coil is energized < > in BLDC motors typically two, or in case of sinusoidal motors, even three phase windings are continuously and simultaneously energized), etc. Furthermore, the phase windings of a SR-motor are considered as "separate windings", which need to be separately and sequentially energized (optionally with some overlap at the transition). In case of a defect, these windings can be individually repaired, which is more difficult or impossible in conventional AC drives. Another difference is that the direction of the current in a phase winding of an SR motor is not important, while the direction of the current in a BLDC motor is very important. Perhaps the most important difference being that, in an SR motor both switches of a particular leg can (and typically are) closed simultaneously, without causing a short circuit between the power rails, because the phase winding is in between. In contrast, both switches of a full transistor bridge must never be closed simultaneously, because it would directly interconnect the two power rails. Finally, in a BLDC motor, there is a current running in the phase windings at almost every moment in time (e.g. at least ⅔th of the time for a three phase machine). The current is actively controlled and running in either a positive or negative direction. In an SR machine, phase windings are allowed to "float" (i.e. the terminals not connected to the positive or negative rails) in about ⅔th of a single rotation (for a three-phase machine).

From these differences, which are very well known in the art, it shall be clear that "the world" of Switched Reluctance machines (motors & generators) is completely different from the world of BLDC machines. In each case, there is a common believe that full transistor bridges simply cannot be used to drive SR-motors or SR-generators.

Figure 7:
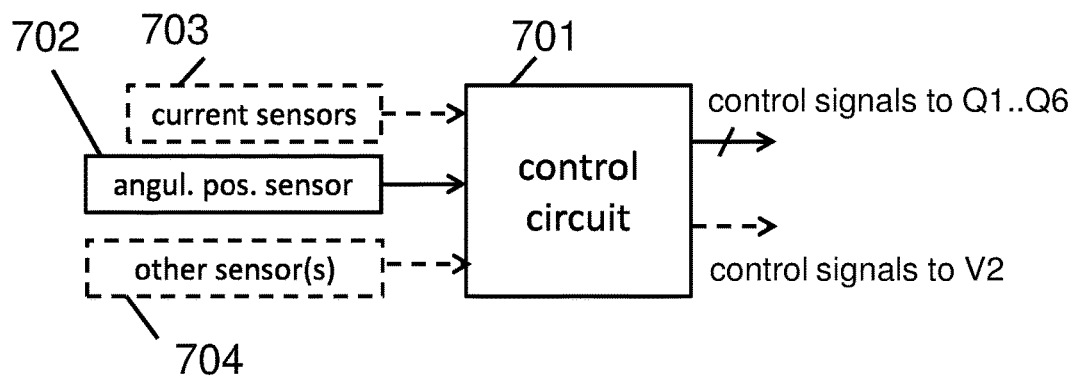
FIG. 7 shows a first embodiment of a Switched Reluctance motor System according to the present invention. In this embodiment three phase windings are arranged as a single ring structure. The ring structure comprises a means for generating a circulating current in said ring.
Figure 7:
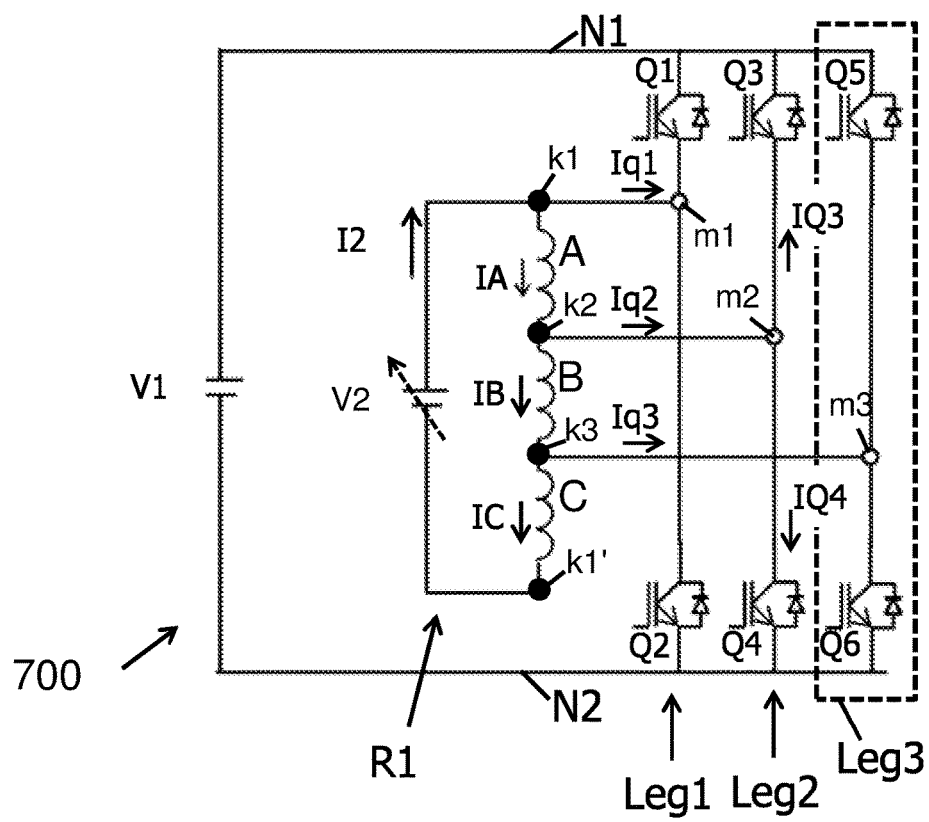

Despite these differences, and in contrast to this common believe, the inventors came to the idea of using full transistor bridges as the legs, and to arrange the phase windings A, B, C of the SR motor of FIG. 2 in a single ring structure R1, as shown for example in FIG. 7 for a motor with three phases, and to interconnect the intermediate nodes k1, k2, k3 between the phase windings A, B, C to the intermediate nodes m1, m2, m3 between the upper power transistors Q1, Q3, Q5 and lower power transistors Q2, Q4, Q6 of the full transistor bridges, where m1, m2 and m3 are typically referred to as the (output) port of the transistor leg. But this arrangement alone, will not work to drive an SR motor.

In addition, they added a means or sub-circuit to or in the ring for causing a circulating current to flow through each of the phase windings A, B, C of the ring structure R1. It is noted that this sub-circuit is part of the power electronics and hence not physically changing the SR Machine. In particular, no additional winding is required, and only existing windings are used.

Figure 10:
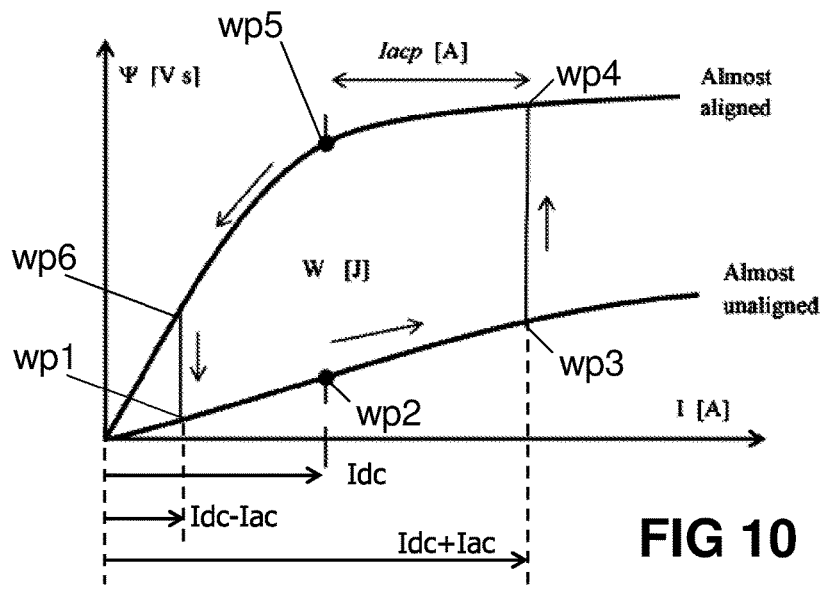
FIG. 10 shows an exemplary flux-linkage vs. current diagram as can be used in embodiments of a Switched Reluctance Motor System according to the present invention.
Figure 11A:
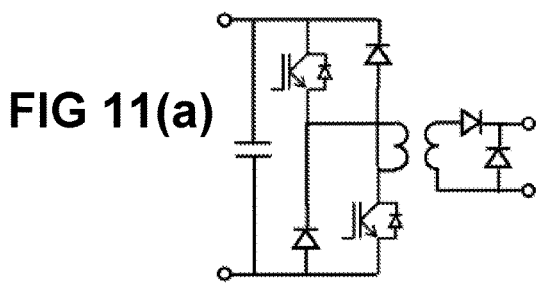
FIG. 11(a) to FIG. 11(d) shows several sub-circuits as can be used in embodiments of the present invention.
Figure 11B:
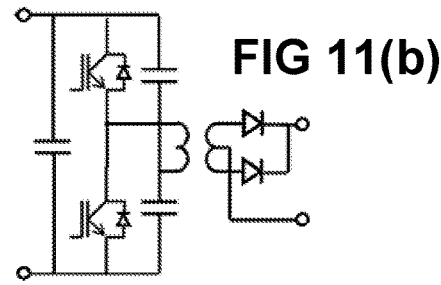
Figure 11C:
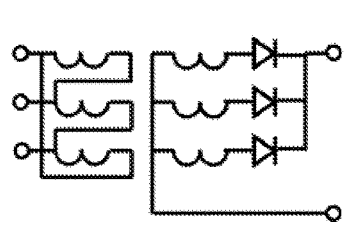
Figure 11D:
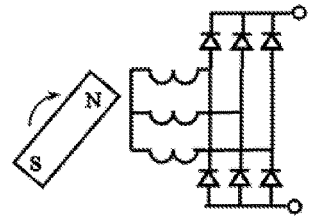

For ease of explanation, the sub-circuit may be an independent voltage source V2, for example a battery, but in practice, preferably a magnetically coupled circuit is used, examples of which will be discussed further, in relation to FIG. 10.

Figure 8A:
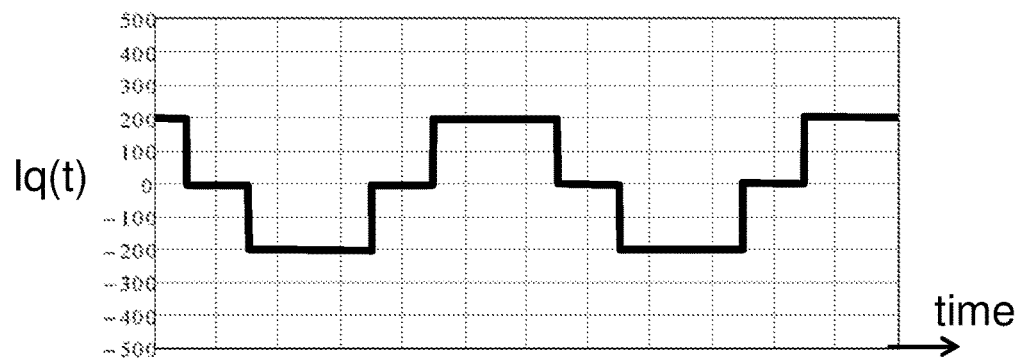
FIG. 8(a) shows an exemplary waveform of the current flowing in a phase winding of the circuit shown in FIG. 7.
Figure 8B:
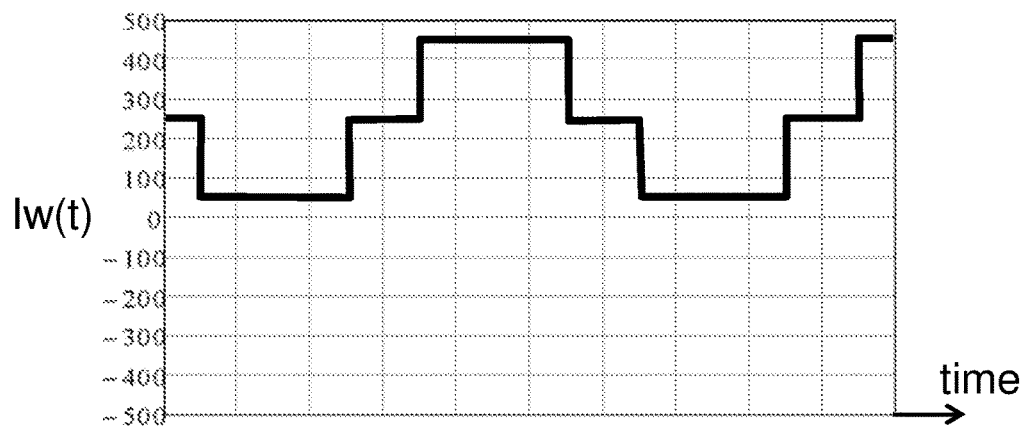
FIG. 8(b) shows an exemplary waveform of the currents flowing in a transistor leg for a 6 phase SR machine.

FIG. 8(b) illustrates how the arrangement of FIG. 7 can drive the SR motor shown in FIG. 7. The working-principle is based on the superposition of a low frequency, circulating current and one or more high frequency currents. The low frequency current is called a "circulating current", as the current circulates in the ring structure R1. The circulating current herein is also referred to as "DC current", even though this current need not have a constant amplitude, but may for example have a ripple on top of a non-zero current value, as would be the case for example when a transformer and a rectifier are used to generate the low-frequency current, or it may even have a varying amplitude over time, and even intentionally to generate some harmonics in the circulating current compared to the leg currents In FIG. 7, according to Kirchoff's law, current Iq2 flowing through the port of leg 2 (m2 in FIG. 7) is equal to the difference of the current IA flowing through winding A, and the current IB flowing through winding B. Stated in mathematical form: Iq2=IA−IB.

Similar relations are true for each of the ports m1, m3 of each of the legs and winding currents at any moment in time. Stated in mathematical form: Iq1=IC−IA, and Iq3=IB−IC.

It will be understood that the current Iq2 through the port of Leg2 is equal to the sum of the current IQ3 flowing through the switch Q3 and the current IQ4 flowing through the switch Q4 (in forward or reverse direction). Thus Iq2=IQ3+IQ4.

So according to the law of Kirchoff, if first the current waveforms i.e. the currents IA, IB, IC at each moment in time in the phase windings A, B, C are defined, the currents IQ1 to IQ6 in the legs are a consequence of it. For instance if the current in a phase winding (for example A) is chosen to be a sinewave current with minimum current level around zero, e.g. as realized via a DC current (from V2) with a sine wave super positioned on it, and the next phase winding (for example B) is the same DC current with a phase shifted sine wave (e.g. 120° phase shift in case of a three phase machine), the currents Iq1 to Iq3 to apply in the legs will also be sine waves, i.e. the difference between the two phase shifted sinewave currents. Such the current waveforms IA to IC flowing through each of the phase windings A, B, C can be realized by appropriately controlling the power switches Q1 to Q6.

It should be understood that any desired current waveform Iq1 to Iq3 applied to each of the ports of the legs can be created using the switches Q1 to Q6 in the legs Leg1 to Leg3. To this end the switches Q1 to Q6 may be opened and closed for example by applying pulse modulated (PWM) type of signals (with a frequency of a few kHz e.g.) of which the width can be controlled. Both the shape of the waveform as well as its amplitude can be actively controlled. A sine wave (as used in the above paragraph) is however not essential for the operation. The circuit works as well with sine waves with harmonics, trapezoids and other waveforms. A major constraint in controlling the switches Q1 to Q6 of the legs is off course that the switches Q1 and Q2 in Leg1, Q3 and Q4 in Leg2 and Q5 and Q6 in Leg3 cannot be closed at the same time, as is well known in the art.

Although explained in FIG. 7 for an SR machine having only three phases A, B, C connected in a single ring structure R1, it will be appreciated that the principle proposed by the present invention also works for SR machines having more than three phase windings, for example six or eight or twelve, or less than three phase windings (as will be further discussed in relation to FIG. 17).

In a specific embodiment of a system (not shown) having six phase windings, each of the waveforms of the (total) current flowing through said phase windings resembles or approximates the waveform shown in FIG. 8(b). The currents flowing through two physically adjacent phase windings of the machine are electrically shifted by 60°. Following the reasoning above with respect to Kirchoff law, if two waveforms of FIG. 8(b) only phase shifted by 60° are subtracted from each other, the result is shown in FIG. 8(a). Hence, the current in the phase winding can be created by injecting a circulating DC current (not shown) and the current in the port of the legs as is shown in FIG. 8(a) It is noted that the embodiment with six phases is particularly beneficial because the difference of the waveform and a phase shifted version of said waveform provides a waveform which looks exactly the same as the original waveform, except that it is DC-shifted. Furthermore, the resulting waveform only has 3 levels (one being zero) which is a fairly simple waveform to be constructed.

Although the waveforms shown in FIG. 8(a) and FIG. 8(b) are especially advantageous in case of an SR machine with six phases, the present invention is not to these particular waveforms, and other suitable waveforms can also be used.

In an example, a peak current of 450 A is generated in the phase windings, which can be obtained by a current of 200 A AC injected via the power transistors, and a DC current of 250 A injected via the circulating current generation means. In this particular example, a ratio of 450/200=2.25 is obtained between peak current in the phase winding and the AC current injected via the transistors. For 6 phases, the ratio of the peak current in each of the phase windings is larger than the AC current in the legs. In other words, for the same phase winding current the circuit of the present invention is able to reduce the power rating of the power switches to about 200 A. Depending on the configuration and the number of phases, this corresponds to a significant reduction of the power rating that would be required for the power switches in traditional power electronics for SRM machines. Even in the best configuration the required power rating would be at least 250 A hence, the present invention results in a reduction of the rated power specification of about 20%.

Figure 9:
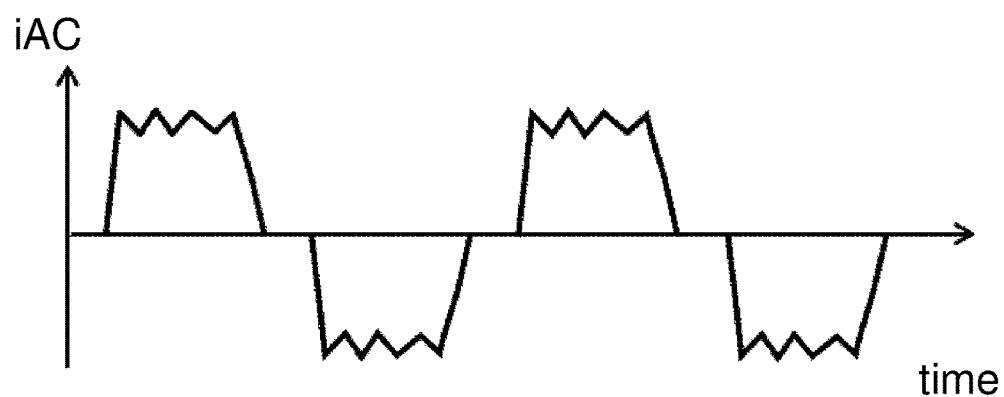
FIG. 9 shows an exemplary current waveform as may be generated by an SR generator according to embodiments of the present invention, but the invention is not limited to these waveforms, and other waveforms, for example having substantially sinusoidal wave portions may also be generated.

FIG. 9 shows an exemplary flux-linkage vs. current diagram for a phase winding A in FIG. 7. Assume that the rotor is in an angular position where the rotor pole of phase winding A is not aligned with the stator pole, and that the circulating current is a DC current, and no AC current is applied, corresponding to working point wp2. If for example Q1 and Q4 are turned on (while the other transistors Q2, Q3, Q5, Q6 are open), the current would increase in dominant phase A to a total current IA=idc+Iac, and the working point would be wp3. Assuming that the current is for example kept constant or nearly constant at value Idc+Iac (for example as shown in FIG. 11 to be discussed further), the rotor will move to align the rotor and stator poles of winding A, and the working point will move to wp4. Then the switches Q1 and Q4 are opened, and the current in winding A quickly drops to the circulating current IA=Idc, and the working point of phase winding A moves to wp5. In the meantime winding B and C get an negative AC current which helps to move them towards dominant state or towards zero current IB=Idc−Iac and IC=Idc−Iac. Some time later, the switches Q2 and Q3 are closed (while the other transistors Q1 and Q4 are open) to create an inverse dominant pulse in phase winding A, and the current in phase winding A becomes IA=Idc−Iac, and the working point moves to wp6. Assuming that the current IA is kept constant or nearly constant at Idc−Iac for a while, the rotor will move to align the stator poles and rotor poles of phase winding B, and thus the rotor and stator poles of phase winding A become unaligned, and the working point (of phase winding A) moves to wp1. When all transistors are opened, the working point moves to wp2.

Figure 4:
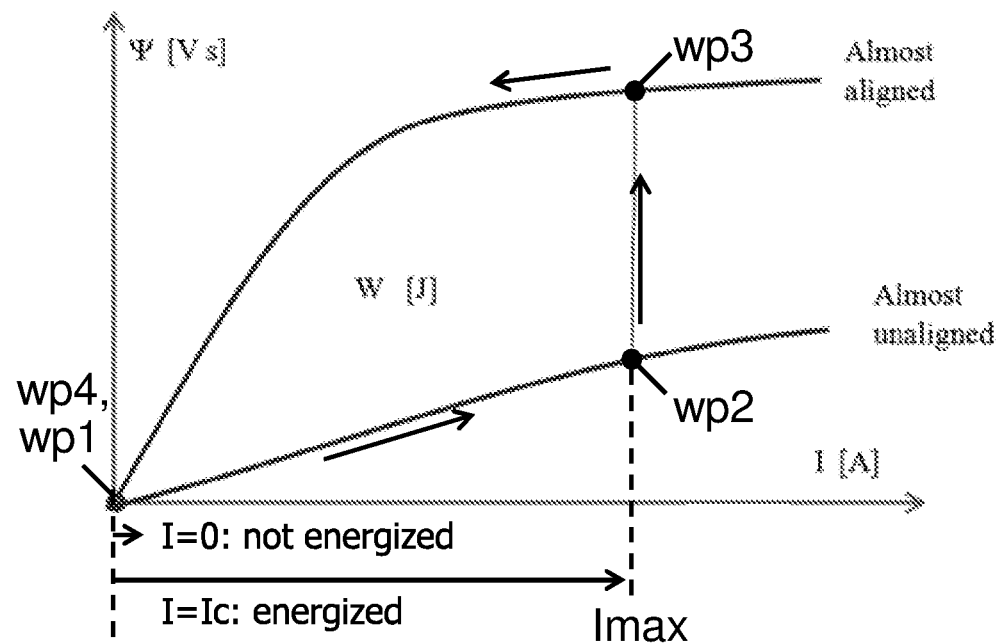
FIG. 4 shows an ideal flux-linkage (Ψ) versus current (I) diagram, representing the energy conversion from electrical energy into mechanical energy.

The comparison of the flux-linkage vs. current diagram of FIG. 9 of the present invention with the flux-linkage vs. current diagram of FIG. 4 of the prior art, shows that the area corresponding to the amount of electrical energy being converted to mechanical energy, would be bigger for an AC current with a given peak to peak amplitude. The peak to peak flux of the present invention is slightly lower than that of the prior art, and the peak-to-peak amplitude of the AC current, being equal to 2×Iac is significantly lower than the original peak current Imax of FIG. 4. The surface W is slightly reduced. The ratio of the surface W and the rectangle defined by the peak current and peak flux is about 70%, hence 0.7×(V1/2)×Iac×2 of the electrical energy would be converted, hence the average power is about 0.35×V1×Iac×2. This means that the proposed circuit and operation of SR machine leads to a conversion/transistor ratio which can be ranked among the best. It is further noted that the traditional circuit of FIG. 5 also requires separated diodes which is not the case in the circuit proposed in the invention, this is also an advantage in terms of costs.

The ratio of energy conversion (electrical to mechanical) increases towards 100% if the ratio of the amplitude of the AC-current Iac and the amplitude of the circulating current Idc decreases, the transistor losses would decrease, but the copper losses associated with the circulating current Idc would increase.

Referring back to FIG. 7, the Switched Reluctance System 700 further comprises a control circuit 701 for providing control signals to the power switches Q1 to Q6. Control circuits 701 for driving power transistors Q1-Q6 are well known in the art, in particular the hardware, and hence need not be described in full detail herein.

It suffices to say that the control circuit would typically comprise a programmable micro-controller or DSP or programmable logic, for example a state-machine, and would preferably have hardware support such as for example three PWM-generators, and optionally one or more analog-to-digital converters ADC's, etc.

Furthermore, the control circuit 701 would typically receive an angular position signal from an angular position sensor 702. Alternatively the angular position of the rotor is estimated in software, in which case the angular position sensor can be omitted. Such algorithms are known in the art and are typically based on inertia and elapsed time since the last commutation, or they are based on injecting small pulses of currents and observing the response, the latter being dependent on the angular position (e.g. WO2010006851A1), or they can be based on closely analyzing measured currents or voltages in the supply lines and/or the phase windings. In fact, many types of sensing means can be thought of to obtain information about the angular position. Of course, the software would be different, but a skilled person having the benefit of the disclosure of this document, is perfectly capable of adapting the software or programming the logic for driving the transistors Q1 to Q6 to generate suitable AC currents through the windings.

Other sensors 704 may also be added, for example a load sensor, and/or a speed sensor and/or one or more temperatures sensors, and the control circuit 701 may take signals provided by them into account for generating the control signals for opening and closing the power transistors Q1-Q6. Temperature sensors can for example be used to limit the operational range to safe temperature levels.

In certain embodiments of the present invention, the circulating current I2 may be a fixed, e.g. predefined current (not adjustable). In other embodiments of the present invention, the means for generating the circulating current I2 may be controllable (indicated by the dotted arrow through V2). In such embodiments, the controller 701 could adjust the circulating current I2 (also referred to as Idc even though it may contain for example a ripple due to rectification), for example the magnitude thereof, depending on for example load conditions and/or on the angular speed of the motor. As such, the area in the flux linkage diagram can adaptively be changed to allow for more or less power in the motor/generator. According to embodiments of the present invention, the means for generating the circulating current also is a means that is continuously available, i.e. the availability is not dependent on the operation of the system or the current running through the phase windings. The means for generating the circulating current may be constant (as indicated above), may be modulated, may be implemented using synchronous rectification. Use may be made of specific harmonic contributions to provide current shaping.

Depending on which kind of energizing pulse is applied to the transistors (for example caused by a constant voltage, or caused by a PWM voltage signal having a constant frequency, or caused by a PWM voltage signal having a variable frequency), the system 700 may further optionally comprise one or more current sensors (not shown), for measuring (i) one or more of the currents flowing between the intermediate nodes m1 and k1, m2 and k2, m3 and k3, and/or for measuring (ii) the total current iA, iB, iC flowing through the phase windings A, B, C, and/or (iii) for measuring the currents iac1-iac6 flowing through the power transistors Q1-Q6. The measured currents may then for example be used to adjust the PWM signals to obtain a pre-defined current shape, for example substantially dome-shaped, or substantially triangular, or substantially rectangular, apart from a transient head and tail, and apart from a super-imposed saw tooth or ripple signal, which signals are typically used in the prior art, although the invention is not limited to these particular shapes, and other shapes may also be used.

FIG. 11 shows a few examples of sub-circuits which can be used to cause the circulating current to flow in the ring R1, also referred to herein as "means for causing a circulating current to flow in the ring", but the present invention is not limited to these sub-circuits, and other sub-circuits can also be used.

Figure 12:
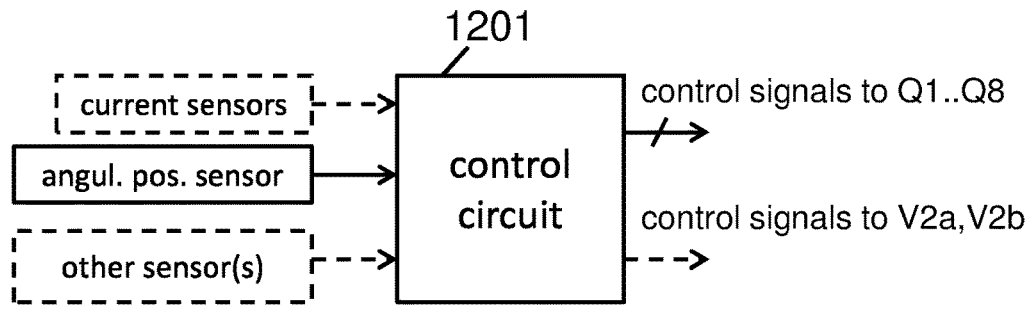
FIG. 12 shows a second embodiment of a Switched Reluctance Motor System according to the present invention. In this embodiment the power circuit contains two ring structures, each ring structure contains two phase windings connected in series. Each ring structure comprises a means for generating a circulating current in said ring.
Figure 12:
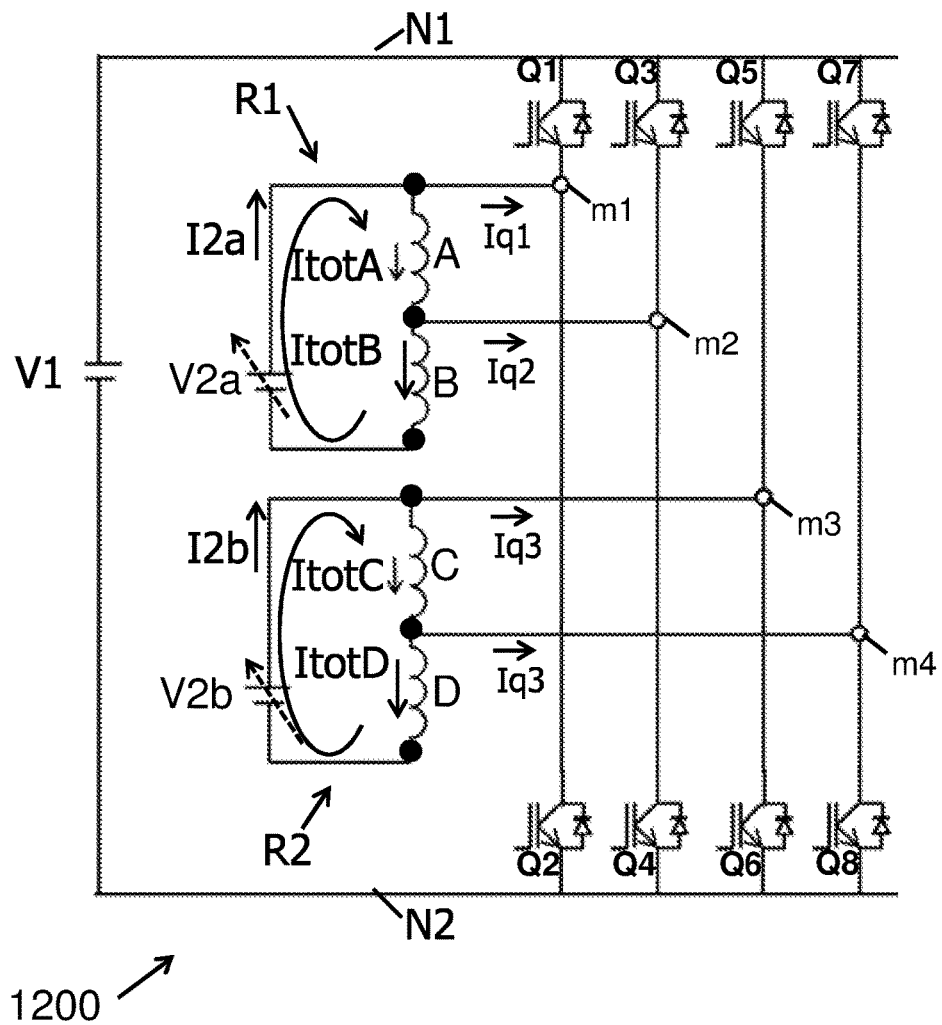

FIG. 12 shows a second embodiment of a Switched Reluctance system 1200 according to the present invention. It comprises a Switched Reluctance Machine having four phase windings A, B, C, D connected to eight power transistors Q1-Q8, preferably in the form of four full transistor bridges. The phase windings A, B, C, D are arranged as two groups of two phase windings each. The phase windings A, B are arranged in a first ring topology R1, the phase windings C, D, are arranged in a second ring topology R2. The first ring R1 further comprises a first means V2a for causing a circulating current I2a to flow in the first ring R1. The second ring R2 further comprises a second means V2b for causing a circulating current I2b to flow in the second ring R2. The circulating current I2a in the first ring R1 may be substantially the same as the circulating current I2b in the second ring, but that is not absolutely required.

Apart from the configuration in two rings R1, R2, the same principles of operation as described above, in particular the superposition of a circulating current generated by V2a, V2b and one or more AC currents generated by the power transistors Q1-Q8, are also applicable for this embodiment. Optionally the voltage generation means V2a, V2b are adjustable, but that is not absolutely required, and predefined constant voltages V2a, V2b may also be used, or voltages V2a, V2b proportional to the supply voltage V1 applied over the transistor legs. Optionally current sensors are present (not shown), but that is not absolutely required.

Of course, the present invention is not limited to SR motors having only four phase windings, but would also work for SR motors with more than four phase windings, for example five or more than five phase windings. The phase windings can be arranged in a single ring, or in multiple rings. For example, in case of five phase windings, a single ring R1 containing all five phase windings could be used, or two rings R1, R2, the first ring containing only two phase windings, the second ring containing three phase windings. There need to be at least two phase windings in each ring.

Figure 13:
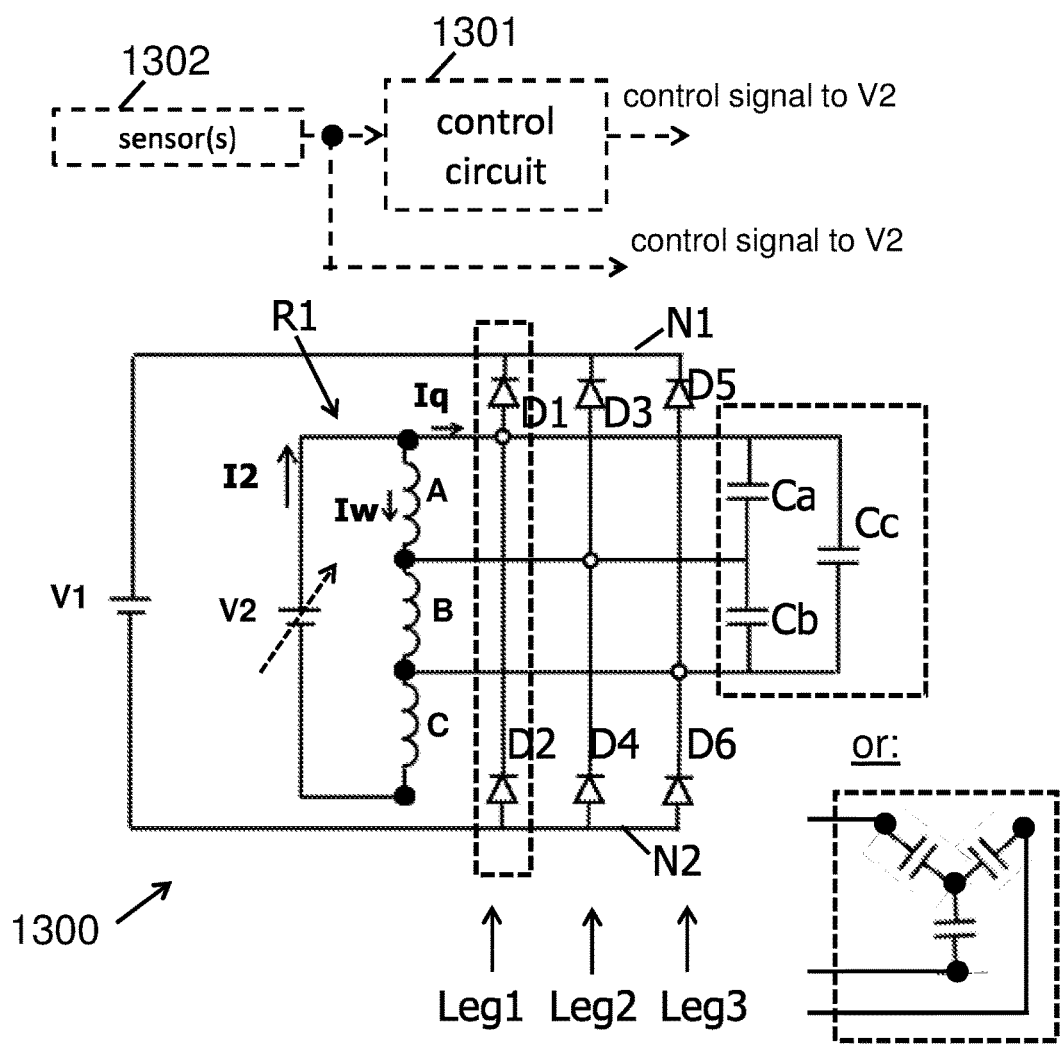
FIG. 13 shows a first embodiment of a Switched Reluctance Generator System according to the present invention. This system uses an SR motor with three phase windings connected in series to form a single ring. The ring further comprises a means for generating a circulating current in the ring. Intermediate nodes of the ring between pairs of phase windings are connected to intermediate nodes of the legs between two diodes. The system may contain capacitors on the nodes.

FIG. 13 shows an embodiment of a switched reluctance system according to the present invention, comprising a Switched Reluctance Generator having a plurality, for example three phase windings A, B, C arranged in a single ring R1.

This power circuit looks and functions very much like the power circuit described in FIG. 7 for the three-phase SR Motor, except that the legs of this power electronic circuit do not contain power transistors, but only passive components, namely power diodes D1-D6 and optionally also capacitors. In the example shown, three capacitors Ca, Cb, Cc are connected in parallel with the phase windings, but the sub-picture below shows three capacitors connected in star. But other configurations are also possible, for example, six capacitors in parallel with the diodes (not shown). It should be noted that each of the capacitors Ca, Cb, Cc can be realized by putting two or more capacitors in series or in parallel.

In its simplest form, the means for generating the circulating current is not controllable, and no capacitors are present. As there are no transistors, also no control circuit is required. This is a major advantage over prior art SR Generator systems. Since no control is required, also no current sensors, no angular position sensor, no angular speed sensor, etc. are required. This circuit may not provide the highest energy efficiency, but for some applications, robustness and/or cost may be more important than power efficiency.

In a variant, the means V2 for generating the circulating current is adjustable, in which case the system 1300 further comprises at least one sensor 1302, e.g. a load sensor, a position sensor (resolver) or an angular speed sensor for providing a signal to the adjustable voltage means V2, directly, or via a control or processing circuit 1301.

When a mechanical force is applied to the rotor of this SR Generator, (for example in wind turbine applications), current waveforms will be generated, and mechanical energy will be converted into electrical energy.

Figure 14:
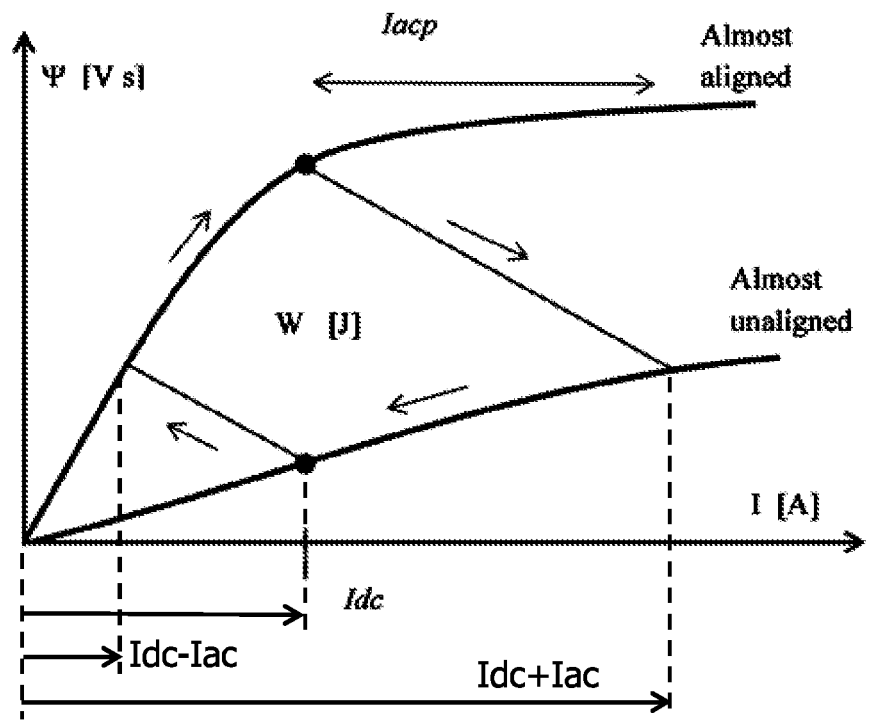
FIG. 14 shows an exemplary flux-linkage vs. current diagram representative for the operation of the Switched Reluctance Generator System of FIG. 13.
Figure 15:
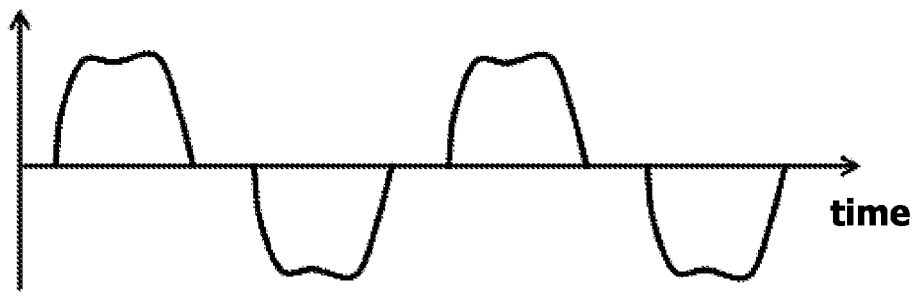
FIG. 15 shows an exemplary waveform of AC-pulses as may be generated by the system of FIG. 13.

FIG. 14 shows an exemplary flux-linkage current diagram applicable for the SR Generator system shown in FIG. 13. Idc represents the circulating current flowing in the ring R1, Iac represents the AC-current flowing through the phase windings A, B, C and through the diodes D1-D6. The working points describe an area having a substantially diamond-like shape. The area represents the amount of mechanical energy converted into electrical energy by each current pulse. Although not shown, it will be appreciated that the area described by the working points will become smaller when the circulating current Idc decreases. Thus, by using an adjustable or controllable means for generating the circulating current, the generator system can be adjusted in function of the available mechanical energy or power. In a motoring system, the Idc can be made variable depending on the amount of mechanical energy or power to be delivered. It is noted that such adjustment can be performed at a much lower frequency than the switching frequency of the transistors of the circuit shown in FIG. 7 or FIG. 12, for example an adjustment at a frequency in the order of 1 Hz to 100 Hz may be quite sufficient.

Figure 16:
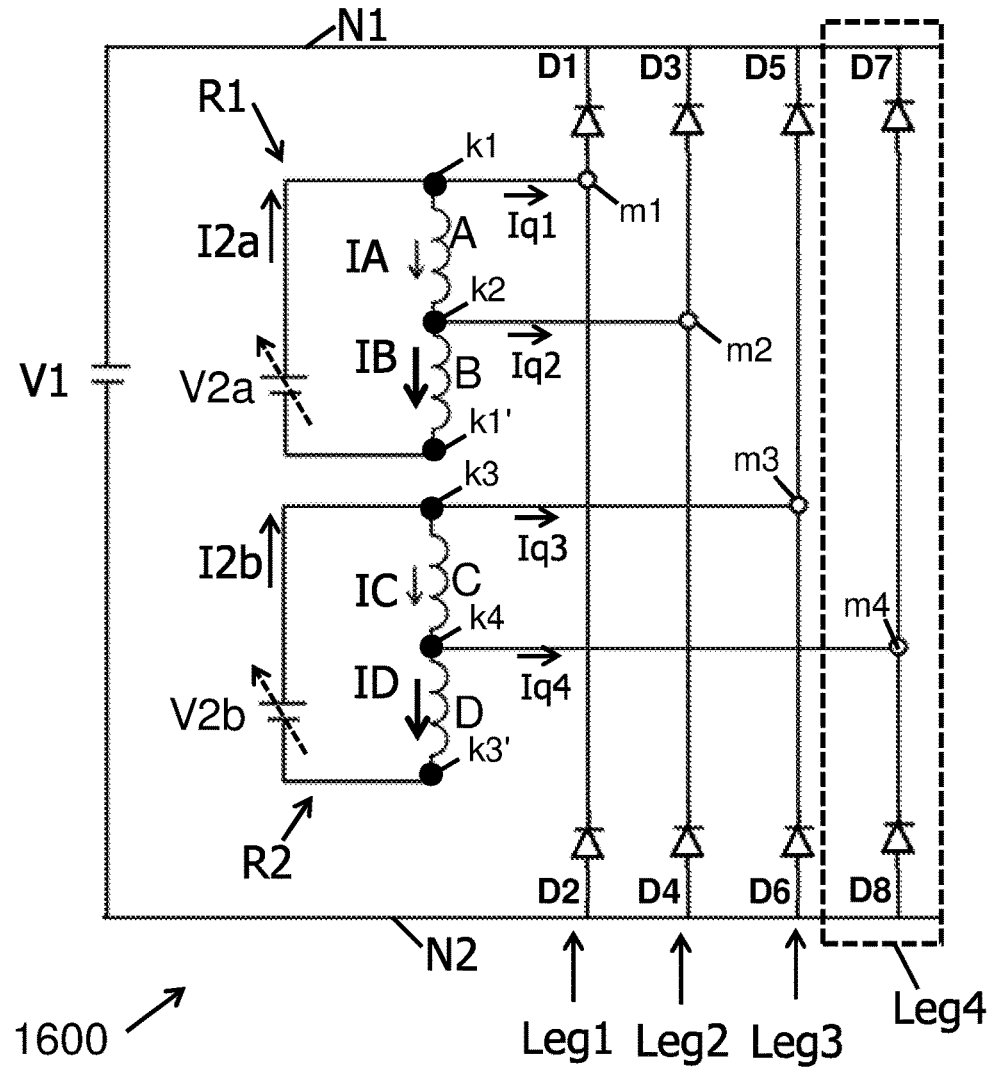
FIG. 16 shows a second embodiment of a Switched Reluctance Generator System according to the present invention. This system uses an SR motor with four phase windings, arranged as two rings of two phase windings each.
Figure 16:
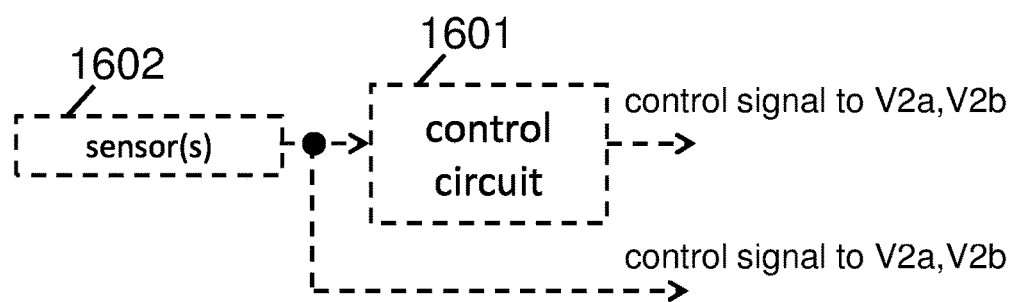

FIG. 16 shows a variant of the Switch Reluctance System of FIG. 13, using a Switched Reluctance Machine with four phase windings A, B, C, D arranged in two groups. The phase windings A, B are interconnected to form a first ring R1. The phase windings C, D are interconnected to form a second ring R2. The power electronic circuit consists of four legs, each leg consisting of two diodes. Optionally the circuit may further comprise a plurality of capacitors (not shown), for example (i) connected in parallel to the phase windings A, B, C or (ii) in parallel with the diodes D1-D8, or (iii) in star. Each of the rings R1, R2 has a means V2a, V2b for generating a circulating current I2a, I2b. If the means V2a, V2b for generating the circulating currents are not adjustable, no control circuit and no sensors are required, resulting in a very robust generator system. If the means V2a, V2b for generating the circulating currents I2a, I2b are adjustable, the system 1600 may further comprise one or more sensors 1602, which may provide their signal directly to the circulating current generation means V2a, V2b, or indirectly via a control or processing circuit 1601.

Figure 17A:
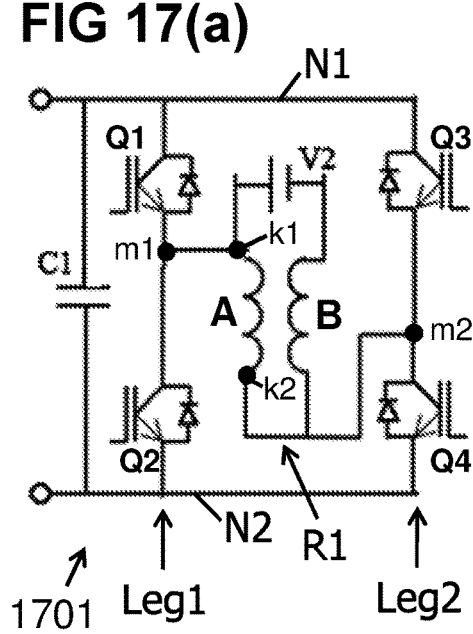
FIG. 17(a) to (d) show four embodiments of a switched reluctance system according to the present invention, where the SR machine contains two phase windings, as can be used for example for 4S/2R, 4S/6R, 8S/4R, 8S/12R switched reluctance SR motor types.
Figure 17B:
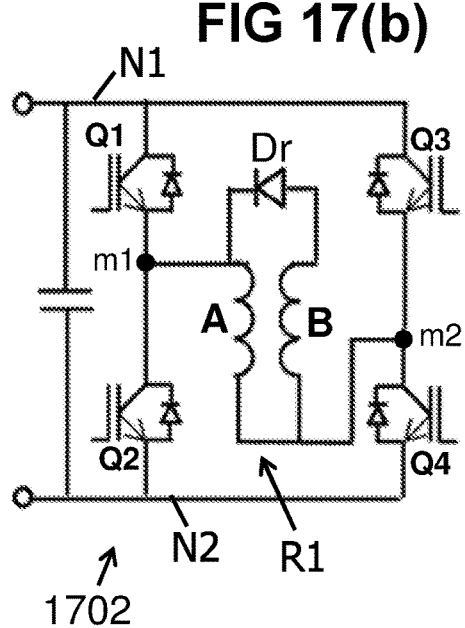

FIG. 17(a) to (d) show several embodiments of SR systems according to the present invention comprising only a single loop containing only two phase windings and no transistor H bridge (FIG. 17c) or only one single transistor H bridge (FIG. 17d) or two transistor H bridges (FIG. 17a, FIG. 17b). The system 1200 of FIG. 12 can be seen as two circuits shown in FIG. 17(a). In each of these examples, one phase winding A, B has a maximal inductance when the other phase winding B, A has a minimal inductance, and vice versa. The series connection provides a substantially constant total inductance. These configurations do not generate a constant torque, but some applications do not require a constant torque.

FIG. 17(a) shows an example with two phase windings A, B forming a single loop. FIG. 17(b) can be seen as a variant of FIG. 17(a) wherein the voltage source V2 is a diode. The circuit of FIG. 17(a) and the circuit of FIG. 17(b) can be used as drive circuit for an SR motor or as drive circuit for an SR Generator.

Figure 17C:
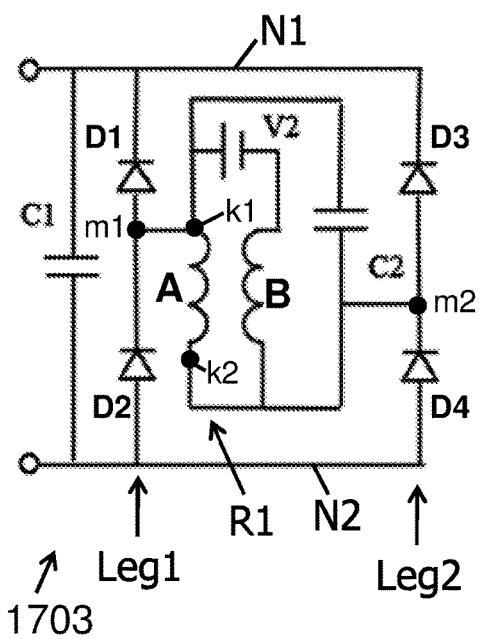

The circuit of FIG. 17(c) can be seen as a variant of FIG. 17(a) wherein all transistors are replaced by diodes, and optionally a capacitor C2 is added. This circuit can only be used with an SR Generator. In a variant of this circuit (not shown), further capacitors can be added, for example arranged in delta, in star or in parallel with the diodes.

Figure 17D:
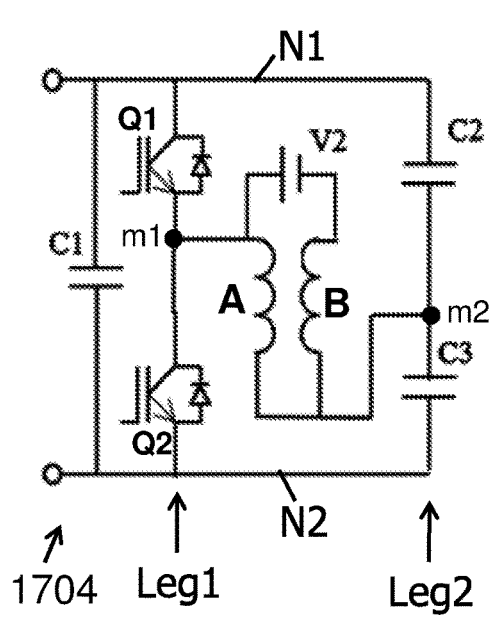

The circuit of FIG. 17(d) can be seen as a variant of the circuit of FIG. 17(a) where two transistors are replaced by capacitors. This circuit only operates at a sufficient speed.

In these circuits, the AC current in a phase winding A, B is only half of the AC current in the legs, which happens for a 4S/2R and a 4S/6R type of motor, thus the power converter is basically reduced to a single H-bridge. The opposite stator teeth form one phase winding, hence two phase windings are created. With a transistor current of 100 A and a circulating DC current of 70 A, the peak current in the winding reaches about 50 A+70 A=120 A. If for example four transistors (two legs) are used rated at 100 A peak, that peak currents of 120 A can be obtained in the phase winding A, B. Thus, the power rating of the transistors can be chosen lower than the current in the phase windings, which may have an important cost benefit. If a classical drive circuit with asymmetric bridges (see FIG. 2) were used to drive the two phase windings A, B, four legs would be required, rated at 120 A peak, having 4 transistors and 4 diodes.

Thus, using any of the circuits shown in FIG. 17(a) to FIG. 17(d) saves in peak rating of the transistors and the fact that no additional diodes are needed. In other words, by adding a means V2 for generating the circulating current allows to use the same transistor legs as are used for BLDC motor and other types of AC motors, which are more readily available, and come in a much higher granularity. The specific type of motor having only two phase windings has a torque which gets zero at some moments, but some applications can still use it. However, this zero-torque disadvantage can be solved for 8S/6R and 8S/10R types where two loops can be made, using two H-bridges.

The reader will appreciate that the circuits of FIGS. 17(a), (b) and (d) further comprise a control circuit (not shown), and may optionally further comprise one or more sensors, similar to the drive circuits described in FIG. 7, FIG. 12, FIG. 13 and FIG. 16. The circuit of FIG. 17(c) only contains passive components, and hence does not require a control circuit or sensors.

In all embodiments described above, where "power switch" is mentioned, an IBGT transistor, any field effect transistor, gate turn off thyristor, bipolar transistor could be used.

The invention claimed is:

1. A system for converting mechanical power into electrical power, the system comprising:
    a switched reluctance machine having a rotor and a stator, the stator having a number of phase windings, the phase windings being partitioned in one or more groups, each group comprising at least two phase windings, all phase windings of each group being connected in series to form a ring structure;
    a power electronic circuit comprising:
    for each ring structure, a means for causing a circulating current to flow in said ring structure, wherein the means for causing a circulating current is independently controllable;
    a number of legs equal to the number of phase windings, each of the legs comprising only passive components including at least two diodes connected in series between a first voltage rail and a second voltage rail, each leg having an intermediate node located between the two diodes, each intermediate node of the legs being connected to a corresponding intermediate node of the ring structure, the intermediate nodes of the ring structure being located between two phase windings.

2. The system according to claim 1, wherein the number of phase windings and the number of legs is exactly two or wherein the number of phase windings and the number of legs is at least three.

3. The system according to claim 1, wherein per ring structure only a single means for causing a circulating current is present.

4. The system according to claim 1, wherein the means for causing a circulating current is controllable independent of the driving of the phase windings.

5. The system according to claim 1, further comprising a number of capacitors,
    wherein optionally the number of capacitors is equal to the number of phase windings and each of the capacitors is arranged in parallel with one phase winding; or
    wherein optionally the number of capacitors is equal to the number of phase windings and the capacitors are arranged in a star-configuration; or
    wherein optionally each of the number of capacitors is arranged in parallel with one of the diodes.

6. A turbine comprising a system according to claim 1.

7. A wheeled vehicle comprising a system according to claim 1.

8. A system for converting electrical power into mechanical power or vice versa, the system comprising:
    a switched reluctance machine having a rotor and a stator, the stator having a number of phase windings, the phase windings being partitioned in one or more groups, each group comprising at least two phase windings, all phase windings of each group being connected in series to form a ring structure;
    a power electronics circuit comprising:
    for each ring structure, a means for generating a circulating current in said ring structure, wherein the means for causing a circulating current is independently controllable;
    a number of at least two legs equal to the number of phase windings, each of the legs comprising at least two power switches connected in series between a first voltage rail and a second voltage rail or some of the legs comprising two power switches connected in series between a first voltage rail and a second voltage rail and the other of the legs comprising two capacitors connected in series between the first voltage rail and the second voltage rail;
    each leg having an intermediate node located between the two power switches or between the two capacitors, each intermediate node of the legs being connected to a corresponding intermediate node of a ring structure, the intermediate nodes of the ring structure being located between two phase windings;
    the controller comprising or being connected to an angular position sensing means for determining an instantaneous angular position of the rotor with respect to the stator;
    the controller being further adapted for providing a plurality of control signals to the power switches of the legs for selectively activating one or more of the switches depending on the angular position of the rotor.

9. The system according to claim 8, wherein the number of phase windings and the number of legs is at least three, and wherein each of the legs comprising at least two power switches connected in series between a first voltage rail and a second voltage rail or
    wherein the number of phase windings and the number of legs is two and one of the legs comprises two power switches connected in series between a first voltage rail and a second voltage rail and the other of the legs comprises two capacitors connected in series between the first voltage rail and the second voltage rail.

10. The system according to claim 8, wherein per ring structure only a single means for causing a circulating current is present.

11. The system according to claim 8, wherein the means for causing a circulating current is controllable independent of the driving of the phase windings.

12. The system according to claim 8,
wherein the system further comprises a plurality of current sensors for measuring a plurality of currents flowing through the power switches, and/or
wherein the system further comprises a plurality of current sensors for measuring a plurality of total current flowing through the phase windings, and/or
wherein the system further comprises a plurality of current sensors for measuring a plurality of currents flowing between the intermediate nodes of the legs and the intermediate nodes of the one or more ring structure;
and wherein the controller is adapted for controlling the power switches such that the currents measured by the plurality of current sensors follow a predefined set of waveforms which are shifted in phase for the phase windings over 360 electrical degrees divided by the number of stator poles.

13. The system according to claim 8, wherein the legs are implemented as half-bridges.

14. The system according to claim 8, wherein the means for generating the circulating current is a synchronous rectifier or wherein the means for generating the circulating current and the different phase windings form a series connection.

15. The system according to claim 8, wherein the means for generating the circulating current is a means for generating a substantially constant circulating current.

16. The system according to claim 8,
wherein the means for generating the circulating current is a means for generating an adjustable circulating current;
and wherein the system further comprises at least one sensing means for providing information related to at least one of the amplitudes of the phase winding currents, mechanical loading conditions, a temperature, an angular speed of the rotor;
and wherein the means for generating the circulating current is adapted for adjusting the circulating current based on the information obtained from said at least one sensing means.

17. The system according to claim 8, wherein all phase windings of the switched reluctance machine are arranged in a single ring structure.

18. The system according to claim 8, wherein the means for generating the circulating current comprises a magnetically coupled circuit, optionally further comprising at least one switch and optionally further comprising at least one diode.

19. Method of repairing or upgrading an existing system comprising a switched reluctance machine with at least three phase windings, the method comprising the steps of:
a) disconnecting an existing power electronics circuit from the existing switched reluctance machine;
b) partitioning the phase windings of the switched reluctance machine in one or more groups, each group comprising at least two phase windings, and
c) connecting all phase windings of each group in series to form a ring structure;
d) for each ring structure, providing a means for generating a circulating current in said ring structure; the means for generating a circulating current being an independently controllable means for generating a circulating current,
e) providing a number of at least three legs equal to the number of phase windings, each of the legs comprising at least two diodes or at least two power switches or at least two capacitors connected in series between a first voltage rail and a second voltage rail, each leg having an intermediate node located between the two diodes or between the two power switches or between the two capacitors;
f) connecting each intermediate nodes of the legs with a corresponding intermediate node between two phase windings of the one or more ring structures.

20. The method of claim 19, wherein the legs comprise two power switches, and wherein the method further comprising the steps of:
g) providing a controller comprising an angular position sensing means or operatively connected to an angular position sensing means, and connecting the controller to the plurality of power switches.

* * * * *